350-316. SR 7-3-73 XR 3,743,586

July 3, 1973 J. L. VOSSEN 3,743,586

METHOD OF MAKING A COLOR ENCODING FILTER ASSEMBLY

Filed April 5, 1971

United States Patent Office 3,743,586

Patented July 3, 1973

3,743,586

METHOD OF MAKING A COLOR ENCODING FILTER ASSEMBLY

John Louis Vossen, Bedminster, N.J., assignor to RCA Corporation

Continuation-in-part of abandoned application Ser. No. 867,514, Oct. 20, 1969. This application Apr. 5, 1971, Ser. No. 130,975

Int. Cl. C23c *15/00*

U.S. Cl. 204—192 4 Claims

ABSTRACT OF THE DISCLOSURE

A method of making a color encoding filter assembly includes the steps of depositing a first optical filter layer on a substrate and removing selected portions of the filter layer by radio frequency sputter etching to produce a first pattern in the filter layer. A second filter layer is then deposited directly on the substrate and the first filter layer. Selected portions of the second filter layer are removed to produce a second pattern superimposed on the first pattern.

CROSS-REFERENCE TO RELATED APPLICATION

This is a continuation-in-part of application Ser. No. 867,514, filed Oct. 20, 1969, and now abandoned and entitled, "Method for Producing Patterns in Dichroic Filters."

BACKGROUND OF THE INVENTION

The invention relates to color encoding filters, and in particular concerns a novel method of making a color encoding filter assembly for a light image pickup device.

Various methods have been devised for recording information from a color image on a black and white recording medium while retaining a substantial portion of the color information present in the color image by encoding it. One type of color encoding makes use of a color encoding filter assembly which consists of a series of closely spaced, narrow color filter strips arranged in a regular pattern on a transparent supporting substrate. Light focused through the filter forms an image in which colors are separated and arranged in a pattern corresponding to the filter pattern. The image may be picked up by a photosensitive surface located at the output side of the assembly and converted to an electrical signal by a television camera tube as described, for instance, in the U.S. Pat. No. 3,378,633, issued to A. Macovski.

One type of color encoding filter assembly presently used for color encoding vidicon television camera tubes is a faceplate having on one surface a crossed grid of narrow, subtractive, multilayer, inorganic color filter strips. Multilayer and inorganic filters are chosen to prevent organic contamination of the evacuated interior of the camera tube. A separate color passes through the strips of each grid, a third separate color where the grids cross, and all colors in the spaces between the grids. Light which has passed through the filter assembly strikes a photoconductive target. The target is scanned in a direction transverse to the strips of one grid by an electron beam. The camera tube output signal attributable to light which has passed through that grid is a different frequency than that attributable to light which has passed through the other grid. Thus, two separate signals corresponding to separate colors in the image may be derived from a single camera tube. Signal attributable to light passing through spaces between the grids and through both grids where they cross may be utilized as a luminance signal.

In order that crosstalk between the various different color portions of a crossed-grid encoding filter be minimized, it is desirable that both grids be as close as possible to one another and to the target of the camera tube. The reason for this is that for maximum definition of the image it must be in focus at the plane of the target. The greater the distance that light must travel after passing through the filter before it reaches the target, the greater the extent of crosstalk between light passing through the different color portions.

Present methods of making a crossed-grid encoding filter include forming a first filter grid pattern directly on a transparent tube faceplate. A second filter pattern is then formed on a very thin transparent glass substrate, or microsheet. The two grids are then clamped or bonded together with a transparent adhesive, and the photoconductive target formed on the opposite side of the microsheet.

The microsheet, however, prevents the filter from being sufficiently close to the target. Its presence results in substantial crosstalk and decreases the transmission of light to the target. Crosstalk and decreased transmission problems are further aggravated by a number of reflecting surfaces which result from the lack of direct contact of the first grid with the microsheet and that of the second grid with the faceplate.

SUMMARY OF THE INVENTION

The novel method of making a color encoding filter asesmbly comprises depositing on a transparent substrate a first filter layer. The first filter layer is then etched into first filter portions of a first pattern by radio frequency ion bombardment etching. A second filter layer is next deposited directly on the substrate and the first filter layer portions of the first pattern. The second filter layer is then etched into second filter portions of a second pattern by radio frequency ion bombardment without substantial etching of the first filter portions.

The novel method permits the making of a filter assembly in which both filters are in direct contact only with a single substrate and with the light sensitive surface or another filter. Thus, light transmission is maximized, while at the same time crossstalk is minimized since the light-sensitive surface may be directly adjacent the filters.

DETAILED DESCRIPTION OF THE PREFERRED EMBODIMENT

General structure and dimensions

Figure 1:
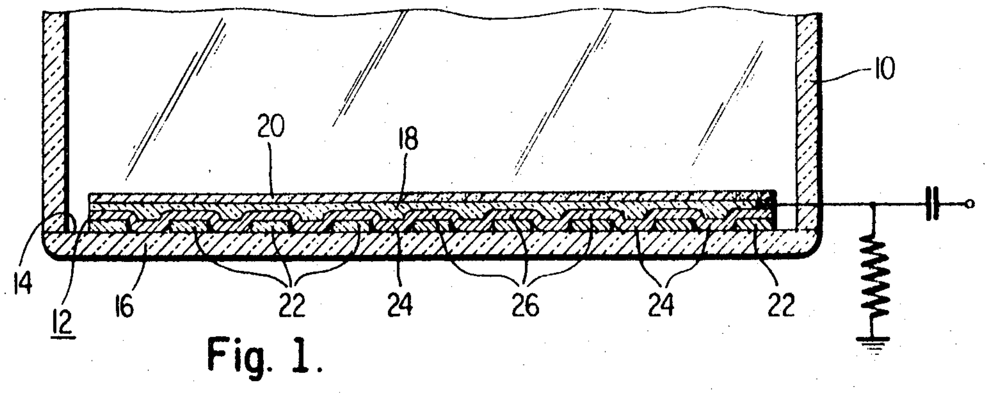
FIG. 1 is a lateral, exaggerated cross section of a vidicon camera tube end portion, including a color encoding faceplate assembly made in accordance with the preferred embodiment.
Figure 2:
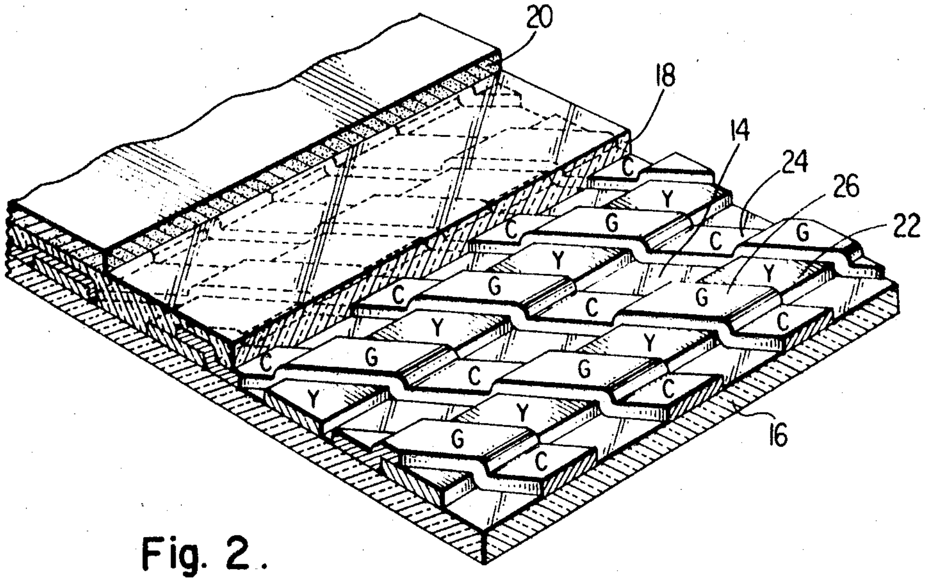
FIG. 2 is an enlarged perspective view of a surface portion of the color encoding faceplate assembly and filter of FIG. 1.

In a preferred embodiment of the invention, a vidicon television camera tube 10, a portion of which is shown in FIG. 1, is provided with an inorganic, multilayer, interference, color encoding filter 12 on the inside surface 14 of a faceplate 16. Adjacent and in contact with the filter 12 is a transparent signal electrode 18. Adjacent and in contact with signal electrode 18 is a photoconductive target 20.

The faceplate 16 is a disc of optical glass about 0.25 cm. thick and about 2.5 cm. in diameter. That major surface 14 (hereinafter referred to as "faceplate surface") of the faceplate 16 which is to be inside an assembled camera tube is provided with two grids of regularly spaced color filter strips. The first grid lies entirely on the faceplate surface 14 and consists of 212 yellow filter strips 22 are composed of inorganic multilayer interfertween them are of approximately equal width. The yellow strips 22 are composed o finorganic multilayer interference filters which pass light having a wavelength of about 4000 A. or longer and have 50% transmission for 5000 A. light. The second grid also lies on the faceplate surface 14 but overlaps the first grid. The second grid consists of cyan filter strips 24 which lie at an angle of 45° to the yellow strips 22 of the first grid. The cyan strips 24 have the same width and spacing as the yellow strips 16. They are also of inorganic multilayer interference layers. The cyan strips 24 pass only light having a wavelength of about 7000 A. or less and have 50% transmission for 5800 A. light. An idealized perspective view of the color encoding filter 12 is shown in FIG. 1 with portions of the overlying signal electrode 18 and photoconductive target 20 cut away. Light passing only through the faceplate 16 emerges unfiltered, or white, in the regions of exposed faceplate surface 14. Light passing only through the yellow strips 22 emerges yellow. Light passing only through the cyan strips 24 emerges cyan. Light passing through the overlap portions 26 emerges green. Thus, an image passing through the filter 12 becomes subdivided into four separate dot images corresponding to white, yellow, cyan and green, each slightly set off from the other three.

When the faceplate 16 complete with filter 12, signal electrode 18, and target 20 is incorporated in the vidicon 10, the light emerging from the filter is focused on the target. The target 20 is scanned by an electron beam with the horizontal scan being at right angles to the first grid and hence at 45° to the second grid. Since the frequency at which the beam encounters target 20 areas under strips in the second grid, the output signal of the target 20 will have a separate frequency for the two color components yellow and cyan of the incoming light. Green passes through all portions of the filter 12 to approximately the same extent, and therefore it is convenient to use green as a luminance signal.

Method of fabrication

The encoding filter is formed directly on the faceplate surface 14. The clean faceplate 16 is placed in a vacuum chamber and the entire faceplate surface 14 is covered with a continuous yellow inorganic multilayer dichroic interference filter layer by the following steps:

A first layer of zinc sulfide (ZnS) is evaporated from a resistance-heated tantalum boat at a vacuum pressure of about $10^{-5}$ torr to a thickness corresponding to ¼ wavelength of 4000 A. wavelength light in the material. The correct thickness is monitored by passing a 4000 A. light through the faceplate and to a photomultiplier tube, and observing the output of the photomultiplier during evaporation. When the output is at a minimum, the layer is approximately one-quarter wavelength thick. A second layer, of thorium fluoride ($ThF_4 \cdot 4H_2O$), is then evaporated on the zinc sulphide layer to a thickness of ¼ the wavelength of 4000 A. wavelength light in the thorium fluoride. The thorium fluoride is deposited by substantially the same method as the zinc sulphide layer. The process is continued with alternating layers of zinc sulphide and thorium fluoride until four layers of zinc sulphide and three layers of thorium fluoride have been formed. Then, a last layer of thorium fluoride is deposited on the previous layer of zinc sulphide to a ½ wavelength thickness.

The faceplate 16 is now removed from the vacuum chamber and the entire yellow filter layer is covered with a photoresist. A commercially-available photoresist such as "KMER," "KTFR" or "KPR" trademark resist manufactured by the Eastman-Kodak Co. of Rochester, N.Y. is suitable for sputter etching. Alternatively, the resist may be a short oil alkyd resin combined with a sensitizer. The photoresist is exposed to a grid of light having the desired dimensions of the finished filter strip grid and then developed by standard techniques to remove unexposed photoresist, leaving a mask of exposed photoresist which is somewhat thicker than the filter layer.

The faceplate 16 with the filter layer and mask, is now placed on a larger silicon dioxide backing plate in vacuum chamber adapted to the process of radio frequency sputter etching, or ion bombardment etching. The mask and exposed filter layer areas are etched by such sputter etching until substantially all exposed filter layer material has been removed. During the etching, silicon dioxide from the backing plate back-scatters to the photoresist to prevent degradation of the photoresist by reactive dissociated sulphur and fluorine ions from the filter material. In radio frequency sputter etching, the material is bombarded by ions from a radio frequency excited inert gas, or plasma, such as helium, which is also termed a glow discharge. Techniques for radio-frequency sputter-etching are described in detail, for instance, in the following references:

(1) U.S. Pat. No. 3,525,680, issued Aug. 25, 1970, to P. D. Davidse et al.
(2) J. L. Vossen et al., "R-F Sputtering Processes." RCA Review, 29, No. 2, 149–179 (June 1968).
(3) J. L. Vossen et al., "Back Scattering of Material Emittted From RF-Sputtering Targets," RCA Review, 31, No. 2, 293–305 (June 1970).

The extent of etching is monitored by time measurement. The etching rate varies somewhat with the configuration of the etching system and with several parameters which are important to the etching system. However, the correct etching time can be readily determined for a particular system with particular parameters in a standard fashion by a short series of trials. The particular values of several important parameters during the etching step for the preferred embodiment were a peak-to-peak radio frequency voltage of 2750 volts, a radio frequency of 7.4 megahertz, a magnetic glow containment field of 35 gauss in the etch region, a sheath voltage of 680 volts negative, a distance of 3½" from the sputtering target to a grounded plate above the target, and an argon pressure of about $2.7 \times 10^{-3}$ torr. The peak-to-peak voltage and sheath voltage can be varied considerably within a wide range. The etching rate varies with both the peak-to-peak and sheath voltage. Depending upon what rate of etching is desired, the peak-to-peak voltage can be as high as 3800 volts and the sheath voltage, which is dependent on the peak-to-peak voltage, can be as much as 950 volts negative. At voltages numerically in excess of 950 volts for sheath voltage, radiation damage to the filter layer becomes significant. The magnetic field strength may be as high as 60 gauss. However, stronger fields result in uneven etching rates.

The etching time required for etching away the exposed yellow filter layer material is about 70 minutes. Although the exposed filter material is entirely removed, the photoresist mask on the unexposed filter areas is sufficiently thick that it is not entirely removed. It therefore completely shields the underlying filter from sputtering effects.

The mask material remaining after the etching step can be removed by a short sputter etching in an oxygen discharge for a period of about 5 minutes with an oxygen pressure of about $3 \times 10^{-2}$ torr, a peak-to-peak radio frequency voltage of about 2000 volts, an average surface potential of about 500 volts negative on the photoresist, and a magnetic field of about 35 gauss. The mask material is thereby carbonized and turned to volatile materials. These evaporate off the surface without disturbing the underlying yellow filter strips 22.

After completion of the yellow strips 22, the entire faceplate surface 14 and the yellow strips 22 are covered with a continuous inorganic, cyan, multilayer, interference filter layer. The cyan filter layer is deposited by evaporation much as the yellow filter layer was deposited. The first layer is ZnS. Alternating layers of the $ThF_4 \cdot 4H_2O$ and ZnS are deposited until there are five layers of ZnS and four layers of $ThF_4 \cdot 4H_2O$. All these layers however, have their thickness monitored with light having a 7000 A.

wavelength. Thus, each layer has a thickness which corresponds to ¼ the wavelength of 7000 A. light in the layer. A final layer of $ThF_4 \cdot 4H_2O$ is then added. This last layer is monitored with 5300 A. light instead of the 7000 A. light used for the other layers and is somewhat thinner than the preceding $ThF_4 \cdot 4H_2O$ layers.

By the same techniques used for etching the yellow filter layer into a grid, the cyan filter layer is etched into a grid which is at 45° to the yellow grid. The etching parameters are generally the same as those for etching the yellow filters, except that the etch time is approximately 7.7% longer than that required for the yellow filter, due to the greater thickness of the cyan filter. By accurately timing the etching of the cyan filter layer, the cyan filter layer can be etched off to a predetermined thickness with an accuracy of within about 1.5% of the original filter layer thickness. That accuracy is sufficient to permit etching the exposed cyan filter material off the underlying yellow filter strips without damaging the yellow filter strips in the process.

General considerations

The optimum parameters used in the sputter etching process described are, of course, determined by the particular circumstances and the particular equipment used. Although the filters used in the preferred embodiment are dichroic filters of the multilayer type, there are other types of filters, such as single layer types or any other types, that lend themselves to the processes of etching described in the specification. The filters described therein have been found to be particularly well suited to commercial color television camera tube applications. The radio frequency sputter etching of the filters results in a very well-defined edge with essentially no undercutting. Moreover, the control of the etching process is so precise that the top filter can be etched off the underlying filter to an accuracy sufficient for the bottom filter to operate in its normal fashion. Etching of dichroic filters of the multilayer type as described herein would be very difficult by chemical means, since the various layers would have different etch rates and since there would be a substantial amount of undercutting. Furthermore, by chemical etching, the top filter could not be etched off the bottom filter without substantial damage to the bottom filter.

The method of removing the photoresist by oxygen discharge prevents the peeling away of the filter strips from the faceplate surface during tube fabrication. Such peeling would ordinarily occur if the resist residue were removed by chemical means.

It has been found that a photoresist consisting essentially of a short oil alkyd resin and a sensitizer is particularly well suited for radio frequency sputter etching. Such a photoresist has a surprising degree of resistance to the etching and thus may be applied in thinner layers than standard photoresists. A thinner layer of photoresist results in better definition of the etched pattern. Therefore this type of photoresist is particularly advantageous for practicing the preferred embodiment of the present invention. Specifically, the photoresist for the preferred embodiment is obtained as follows:

A short oil alkyd resin is prepared by reacting together:

| | Percent by weight |
|---|---|
| Tall oil fatty acid (1% resin) | 25.0 |
| Phthalic anhydride | 35.5 |
| Pentaerythritol | 18.0 |
| Tri methylol propane | 16.9 |
| Benzoic acid | 4.6 |

The ingredients are reacted at a temperature of about 200° C. until the product has an acid number of between 5 and 25.

The alkyd resin thus prepared in an amount of, for example, 225 gms., is heated with stirring to 200° C. for one hour under nitrogen, then cooled to 100° C. Methylcyclohexane in an amount of 900 ml., is added and the mixture is heated to reflux with stirring. After 1 hour, heating and stirring are discontinued and the supernatant liquid is decanted. The remaining imbibed solvent is removed by distillation after which the recovered polymer, approximately 185 gms., is dissolved in the desired solvent, decanted and filtered.

The above-described treatment is for the purpose of removing the low molecular weight ends of the alkyl resin. Preferably, about 15–40% of the original material should be removed.

To make up a photoresist material, the modified alkyd resin is dissolved in toluene or a mixture of toluene and xylene to make up a 20 wt. percent solution. A sensitizer is then added in an amount of about 6 wt. percent of the resin. The sensitizer may be, for example, 2,6-bis-(para-azido-benzylidene)-4-methylcyclohexanone. Other suitable sensitizers are: benzoin, benzophenone, 2,3-butanedione, 4,4,4,4′-bis-(dimethylamino) benzophenone, benzoin methyl ether, 2-methylanthraquinone, and 2-chloroanthraquinone. Mixtures of these may also be used.

I claim:

1. A method of making a color encoding filter assembly, comprising:

(a) depositing a first series of thin, transparent layers of zinc sulfide and thorium fluoride on a transparent substrate by vapor deposition to form a first laterally continuous, inorganic, multilayer, interference filter; then, (b) etching a first, regular pattern in said first filter by radio frequency ion bombardment etching, at a frequency of about 7.4 megahertz and by masking with photoresist comprising a short oil alkyd resin and sensitizer; then, (e) depositing a second series of thin, transparent layers of zinc sulfide and thorium fluoride directly on said faceplate and said first filter of said first pattern by vapor deposition to form a second laterally continuous, inorganic, multilayer, interference filter; then, (d) etching a second regular pattern in said second filter by radio frequency ion bombardment, at a frequency of about 7.4 megahertz and by masking with photoresist comprising a short oil alkyd resin and sensitizer, without substantially altering the physical dimensions of said first filter in said first pattern.

2. The method defined in claim 1 wherein said second pattern is angularly displaced from said first pattern.

3. The method defined in claim 1 wherein a portion of photoresist material used to mask portions of said first and second filters during said etching, and remaining on said filter after said etching is completed, is removed by bombardment with ions from a radio frequency glow discharge under partial vacuum in oxygen at a pressure on the order of 30 millitorr with a peak-to-peak radio frequency voltage of about 2000 volts, with an average surface potential of about −500 volts on said photoresist, and a magnetic field of about 35 gauss.

4. The method defined in claim 3 wherein said photoresist comprises a short oil alkyd resin and a sensitizer.

References Cited

UNITED STATES PATENTS

| | | | |
|---|---|---|---|
| 3,474,021 | 10/1969 | Davidse et al. | 204—192 |
| 3,585,121 | 6/1971 | Franks et al. | 204—192 |
| 3,640,811 | 2/1972 | Vossen | 204—192 |
| 3,664,942 | 5/1972 | Havas et al. | 204—298 |

JACOB H. STEINBERG, Primary Examiner

U.S. Cl. X.R.

156—17, 2; 178—5.4; 350—316